No. 638,565. Patented Dec. 5, 1899.
J. B. DOYLE.
WAREHOUSE TRUCK.
(Application filed June 6, 1899.)
(No Model.)

WITNESSES:

INVENTOR
John B. Doyle
BY
ATTORNEYS

United States Patent Office.

JOHN BARRETTE DOYLE, OF STAMPLEY, MISSISSIPPI.

WAREHOUSE-TRUCK.

SPECIFICATION forming part of Letters Patent No. 638,565, dated December 5, 1899.

Application filed June 6, 1899. Serial No. 719,576. (No model.)

*To all whom it may concern:*

Be it known that I, JOHN BARRETTE DOYLE, of Stampley, in the county of Jefferson and State of Mississippi, have invented a new and Improved Warehouse-Truck, of which the following is a full, clear, and exact description.

The object of my invention is to so construct a warehouse or railroad truck that it may be wheeled up a plank or staging and automatically guided while thereon, thus rendering it possible for merchandise to be carried directly into a car or vehicle or removed directly therefrom to any convenient place of storage.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1:
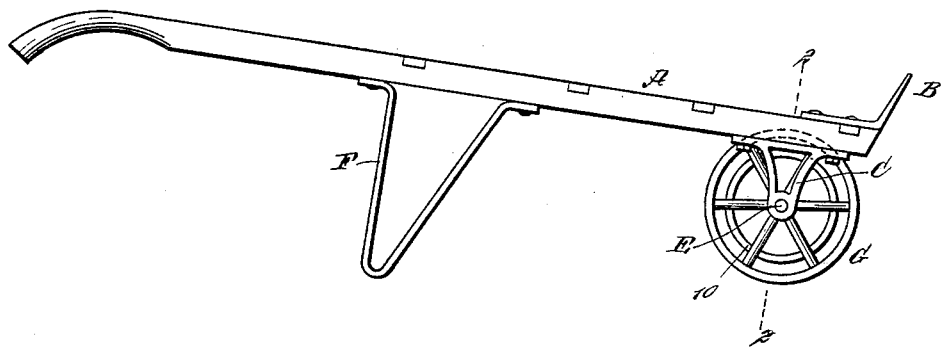
Figure 2:
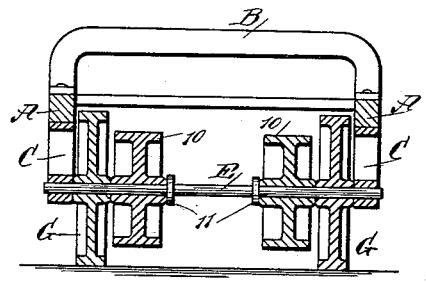

Figure 1 is a side elevation of a truck having the improvement applied; and Fig. 2 is a vertical section through the truck, taken substantially on the line 2 2 of Fig. 1.

A represents the bed of a standard truck; B, the bill thereof; C, the hangers; E, the axle, and F the legs of the truck.

The axle E is of greater diameter than ordinarily and is provided with wheels G, of the standard dimensions, located on the axle in the customary manner; but in addition to the ordinary wheels G two wheels 10, of smaller diameter, are located on said axle between the main wheels, one near each of the latter. The smaller wheels 10 are held spaced apart by suitable collars 11 on the axle, and collars or washers may be placed upon the axle between the hubs of the larger and smaller wheels, if desired, or the hubs of the larger and smaller wheels may be brought close together, as illustrated.

The smaller wheels are about seven inches in diameter and about four inches wide, being therefore much wider than the outer or standard wheels G; but these dimensions may be varied as in practice may be found desirable. The truck is particularly adapted to be used in connection with the plank or staging that extends, for example, from a platform to the interior of a freight-car, and the staging or plank is of slightly-less width than the distance between the inner faces of the outer or larger wheels G. Thus it will be observed that after the truck has been loaded on the platform it may be wheeled directly to the plank or staging into the car for the delivery of its contents. When the truck is being wheeled up or down the truck or staging, the small wheels 10 only travel on the said plank, while the larger wheels extend above and below the upper and lower faces of the plank and serve as guide-flanges for the truck, automatically maintaining the truck properly centered upon the plank or staging.

It is evident also that the truck is very useful for loading merchandise directly from a warehouse or sidewalk into a wagon or other vehicle and that the truck is, furthermore, especially adapted for carrying merchandise or other material over railway-tracks, since when a plank is laid across the tracks the truck may be wheeled over any number of tracks without unduly exhausting the person wheeling the truck and without injury to the truck or displacement of its load. The smaller wheels are made wider-rimmed than the larger ones in order to afford ample bearing upon the narrow plank.

Having thus described my invention, I claim as new and desire to secure by Letters Patent—

In a warehouse or railroad truck, the combination, with the axle thereof and the wheels mounted on said axle, of wheels of smaller diameter also mounted upon the axle, one adjacent to the inner face of each of the main wheels, and means for spacing the inner wheels, whereby the truck may be used in connection with a plank or staging of slightly-less width than the distance between the inner faces of the main wheels, and carried up or down said staging, and automatically guided thereon, the outer and larger wheels serving as guide-flanges when the smaller wheels are brought into action, for the purpose set forth.

JOHN BARRETTE DOYLE.

Witnesses:
J. M. RIDER,
P. D. STAMPLEY.